Sept. 16, 1969   F. H. WALKER ET AL   3,466,869
TORQUE CONVERTER WITH AXIALLY MOVABLE BLADED ELEMENT
Filed Sept. 7, 1967   2 Sheets-Sheet 1

INVENTORS
Frank H. Walker, &
Carlisle R. Davis Jr.
Charles R. White
ATTORNEY

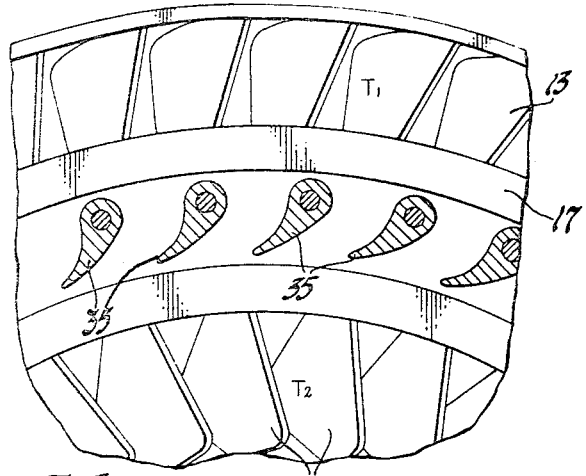
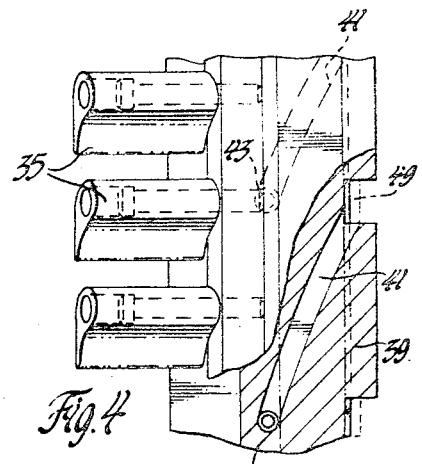
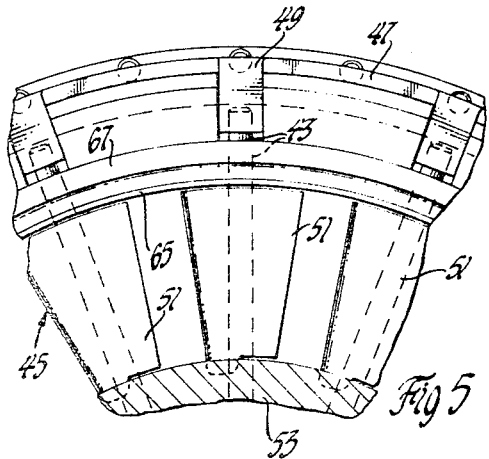
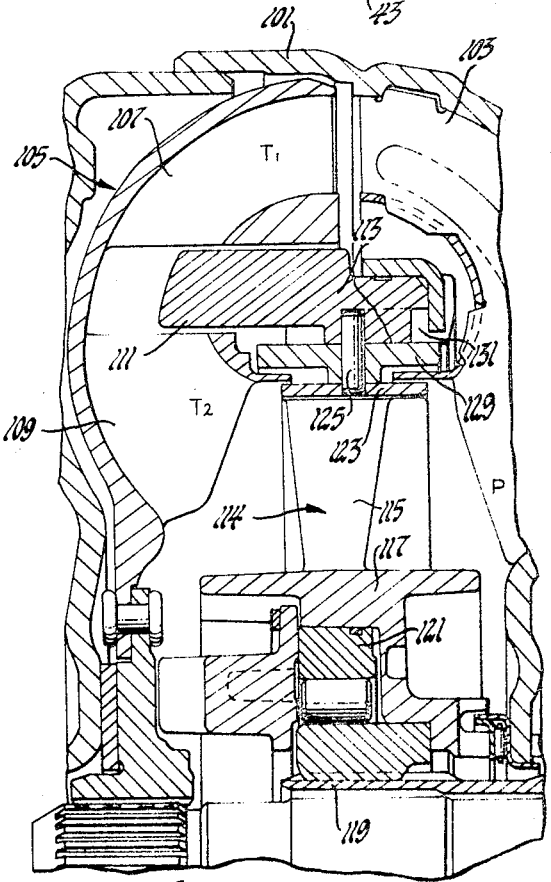

United States Patent Office 3,466,869
Patented Sept. 16, 1969

3,466,869
TORQUE CONVERTER WITH AXIALLY
MOVABLE BLADED ELEMENT
Frank H. Walker and Carlisle R. Davis, Jr., Grand Blanc,
Mich., assignors to General Motors Corporation, Detroit, Mich., a corporation of Delaware
Filed Sept. 7, 1967, Ser. No. 666,104
Int. Cl. F16d 33/14; F16h 41/06
U.S. Cl. 60—54                                    5 Claims

ABSTRACT OF THE DISCLOSURE

A two-stage, three-phase, five-element torque converter with a first stator element disposed between two turbine elements and mounted on a pilot ring carried by a second stator element. A helical slot and pin connection between the pilot ring and first stator element permits axial movement of the first stator element into and out of the converter working fluid flow path in response to changes in the flow path of the converter working fluid as determined by torque demanded from the converter. When a positive torque is developed on the first stator, it will rotate forwardly and automatically screw into the inner core of the converter with only the tips of the first stator blades still in the flow path; when a negative torque is developed on the first stator, it will rotate in a reverse direction and automatically screw back into a working position in the flow path. Both stators are mounted on a single one-way brake. In one embodiment, the second stator has variable pitch blades while in another embodiment these blades are fixed.

This invention relates to hydrodynamic torque converters and particularly to a torque converter having a bladed fluid directing element which is axially movable into and out of the hydraulic fluid flow path in the converter in response to predetermined changes in fluid flow conditions within the converter.

In hydrodynamic torque converters used for power transmissions in vehicles it is often advantageous to provide a plurality of turbine members which convert the kinetic energy of the working fluids circulated in the torque converter into rotating mechanical energy so that large torques are available to the vehicle drive wheels for initially moving the vehicle and for powerful acceleration. In twin turbine torque converters a bladed stator can be positioned between the turbines to change the direction of hydraulic fluid leaving the first turbine to a positive direction to prevent the development of a negative torque on the second turbine particularly during the first phase of converter operation. With the elimination of an initial negative torque on the second turbine, a large stall torque ratio such as 3.5 to 1 can be obtained and vehicle performance is materially improved. By having this stator removed from the converter flow path when torque requirements have diminished, converter efficiency is improved. For economy, free wheel devices are utilized to permit the stators to rotate in the direction of pump rotation so that the stators will not adversely affect the fluid circulating in the converter and the converter can function as a fluid coupling.

In this invention provision is made for the automatic retraction of a bladed element from the flow path of fluid circulating in a torque converter at a predetermined turbine-pump speed ratio and for the automatic return of the bladed element back into the flow path at a lower turbine-pump speed ratio. In the preferred embodiment of this invention the axially movable blade element is a stator which during a high torque multiplication phase of converter operation will be positioned in the fluid flow path to change the direction of fluid flow in a converter so that the converter can efficiently multiply input torque. As torque requirements decrease, this stator is withdrawn from the flow path into the core of the converter torus by change in direction of the velocity component of the fluid circulating in the converter to allow the converter to provide for decreased torque multiplication.

Also in this invention provision is made for mounting two stators on a single one-way brake mechanism to allow both of the stators to simultaneously free wheel. Furthermore, connecting means are provided for movably mounting the axially movable stator element on the other stator element to form a compact construction which permits the withdrawal of the movable stator element from the converter fluid flow path while the other stator is held by a one-way brake for reaction and guidance of converter fluid into a pump.

It is an object of this invention to provide a hydrodynamic torque converter having a bladed element which is automatically movable into and out of the fluid flow path within the converter in response to predetermined changes in the conditions of flow of fluid within the converter.

Another object of this invention is to provide a hydrodynamic torque converter having a pump, a plurality of turbines, a first stator mounted between the turbines and a second stator mounted between the second turbine and the pump and including construction which permits the first stator to be moved by converter fluid to an inoperative position in one condition of converter operation and to further move into an operating position by converter fluid in another condition of converter operation.

Another object of this inventiton is to provide a multi-element, three-phase, two-state hydrodynamic torque converter including a pump, a first turbine, a first stator, a second turbine and a second stator and including a connection between the stators which serves to connect the stators to a one-way braking device and which also serves to allow one of the stators to be axially moved into and out of the fluid flow path of the converter in response to predetermined changes in the flow conditions of the fluid within the converter.

Another object of this invention is to provide a compact, polyphase, torque converter having a bladed element axially movable from a working position in the flow path of the converter working fluid into an inactive position in the guide ring of the converter in response to change in converter fluid flow path on decrease in converter torque demand; from this latter position the bladed element is automatically movable back into the working position in response to another change in the working fluid flow path resulting from increased torque demand on the converter.

These and other objects of this invention will become more apparent from the following detailed description and drawings in which:

FIGURE 3 is a sectional view taken substantially along the line 3—3 of FIGURE 1.

FIGURE 4 is a sectional view taken substantially along the line 4—4 of FIGURE 1.

FIGURE 5 is a sectional view taken substantially along the line 5—5 of FIGURE 1.

FIGURE 6 is a sectional view similar to the FIGURE 1 view illustrating another embodiment of the invention.

FIGURE 7 is a perspective view showing a detail of the torque converter of FIGURE 6.

Figure 1:
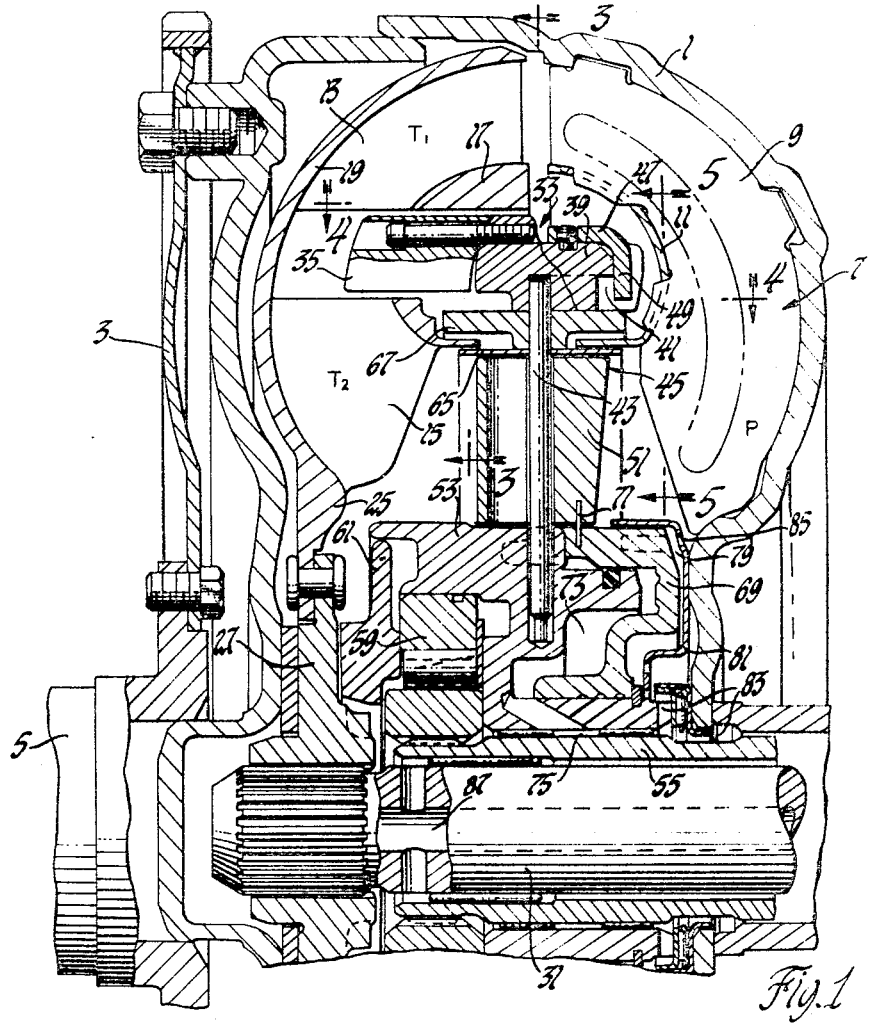
FIGURE 1 is a sectional view of a portion of a hydrodynamic torque converter.

FIGURE 1 illustrates a three-phase, two-stage, five-element torque converter having a housing 1 connected to a front plate 3 which is driven by an input shaft 5. The torque converter housing carries a pump 7 formed by curved blades 9 secured to the interior of one portion of the housing and to an inner annular shell 11.

The torque converter has a turbine assembly within the housing which is spaced from and opposed to the pump which includes first turbine blades 13 and second turbine blades 15 secured between inner and outer shells 17 and 19. These turbine blades have a curvature opposite to the curvature of the pump blades and are spaced from each other to accommodate the blades of a first stator which will be described below.

Figure 2:
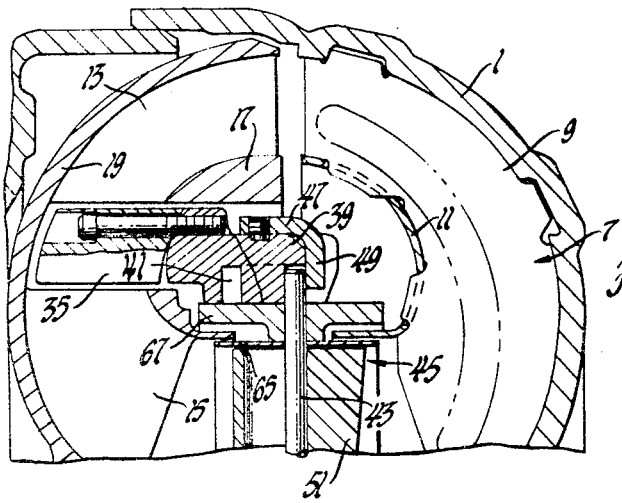
FIGURE 2 is a sectional view similar to the view of FIGURE 1 illustrating some converter parts moved from their FIGURE 1 position.

The turbine assembly has a hub portion 25 which is fastened to a hub 27 splined to a drive shaft 31. The torque converter includes a first stator 33 with identical curved blades 35 secured to a movable, annular carrier 39. The carrier has a plurality of identical helical slots 41 with left hand leads formed on the inner side which fit on radially extending pivot pins 43 of a second stator 45. An annular retainer ring 47 fastened to the outer periphery of the carrier by set screws has bent over ends or tab portions 49 which fit into the ends of the slots 41 and serve as stops for engaging pins 43. As shown in FIGURE 2, the tab portions 49 limit carrier and first stator blade movement into the working position in the space between the first and second turbines. The second stator has blades 51 with a curvature similar to the stator blades 35, mounted on the pins 43 and disposed between the second turbine and pump. The second stator has an annular carrier 53 which is mounted on a ground sleeve 55 by suitable bearings and a one-way brake 59. This one-way brake permits both of the stators to rotate in the same direction as the pump, and locks the stators from rotation in an opposite direction. An annular retainer ring 61 is disposed between the one-way brake and the hub 27 to keep the carrier 53 and the one-way brake in position. The stator carrier supports the pivot pins 43 which are aligned and extend radially outwardly as spokes on a wheel. These pivot pins extend through the blades of the second stator and through openings in a retainer ring 65 and pilot ring 67 and have end portions which fit in the helical slots 41 in carrier 39. Shells 11 and 17 and ring 65 provide a guide ring to smooth out converter vortex flow and reduce fluid turbulence. An annular core is provided inside of these elements for accommodating axial movement of the blades of the first stator under certain converter operating conditions.

The blades of the second stator are pivoted between high and low angular positions with respect to the center line of the converter by operation of an annular piston 69. The piston carries radially extending pins 71 which extend into the stator blades 51 as shown in FIGURE 1. The piston is mounted on the carrier 53 and cooperates therewith to form a first control chamber 73 connected to a first stator control fluid passage 75 operatively connected to an actuator valve, not shown, which controls the passage of fluid into and out of chamber 73. A second chamber 79 is formed by an annular cup 81 which has a rim portion that fits over one side of the piston and an end portion which contacts the inner wall of the torque converter housing. Chamber 79 communicates with a converter fluid input passage 83 and with the converter through openings 85 formed in the cup. Converter input pressure will keep the cup in the FIGURE 1 position. Passage 87 in the drive shaft 31 communicates with the converter and transmits fluid exiting from the converter to a heat exchanger, not shown.

FIGURE 6 is a representation of a three-phase, two-stage, five-element hydrodynamic torque converter which is similar to the converter of FIGURE 1 and the bladed elements define a torus having an annular core. However, this embodiment has fixed second stator blades instead of variable pitch blades as in the FIGURE 1 embodiment. In FIGURE 6, the torque converter housing 101, pump 103, turbine assembly 105 with first and second turbine blades 107 and 109, first stator 111 and first stator carrier 113 are like corresponding elements described in connection with the first embodiment of the invention. The second stator 114 has fixed blades 115 securely mounted on a stator hub 117 which is supported on a ground sleeve 119 by a one-way brake 121. The second stator has an outer annular ring 123 which supports first stator guide pins 125 that extend radially from the outer ring 123 through a pilot ring 129 into corresponding helical slots 131 formed on the inside of the first stator carrier. The slots are like slots 41 and have left hand leads when viewed from the inside of carrier 113.

The pump and stator blades of both embodiments are curved forwardly with respect to a reference point in front of each blade. The blades of the two turbines are curved in a reverse direction from the stator and pump blades. The pump turns with the engine, and at stall, the turbines and stators are stationary. The curved blades of the forwardly rotating pump project converter fluid into the curved passages formed by the first turbine blades. The first stator has its blades in the extended position (FIGURES 2 and 7) and is grounded by the one-way brake to the ground sleeve as it tries to rotate rearwardly. These blades then can reverse the direction of the fluid flow from first turbine and direct the flow into the passages formed by the blades of the second turbine so that the second turbine develops a positive torque. The second stator redirects the fluid exiting from the second turbine back into the pump in a direction which assists pump rotation to provide for converter torque multiplication.

At stall, most of the output torque is developed by the first turbine while only a small torque is developed by the second turbine. As the vehicle utilizing this torque converter begins to move and torque requirements decrease, the pump-turbine torque ratio decreases. During this time the second turbine gradually begins to develop more torque as the first turbine develops less torque. Due to the fact that the torques are additive, high torque multiplication is available during the first phase of converter operation for vehicle performance. At a predetermined pump-turbine speed ratio, the velocity vector of the fluid circulating in the converter will be effective on the reverse face of the first stator. The positive torque developed by the first stator blades turns the first stator forwardly or clockwise and the stator will slide axially on the pilot ring to the inactive FIGURE 1 or FIGURE 6 position within the inner torus provided by the inner shell of the converter. The pin and helical slot connection acts like a threaded connection but with greatly reduced friction surfaces and the first stator will easily screw into the inoperative position.

When the inner ends of the slots contact the outer ends of the pins, stator movement will be stopped. In this position (FIGS. 1 and 6) the tips of the stator blades will still be in the fluid flow path. This permits the automatic extension of the stator blades back into working FIGURE 2 position when the velocity vector of the fluid in the converter is effective on the exposed portion of the working face of the stator blades with a magnitude sufficient to turn the stator rearwardly and cause it to screw back into the working position of FIGURE 2.

With the first stator in the FIGURE 1 position, most of the torque is developed by the second turbine and the converter is operating in the second phase of operation. If torque requirements suddenly become greater, the negative torque of the circulating fluid will change to move the first stator back into the FIGURE 2 position as described. However, if the torque requirements further decrease, the velocity vector of the fluid circulating in the converter will be effective on the rear faces of the second stator blades and the second stator will freewheel, and the converter will go into a coupling phase of operation. When the second stator freewheels, the first stator will also be freewheeling by virtue of the connection between the first and second stator.

In the FIGURE 1 embodiment, the blades 51 of the second stator are positioned at high angles for improved vehicle performance or anti-creep idle by opening chamber 73 to exhaust so that converter input pressure in chamber 79 will move the piston forwardly to pivot stator blades 51 on their pins. To position the blades at low angle for economical cruising, chamber 73 is charged; and the force developed on the inside face of the piston is sufficient to move it rearwardly toward cup 81. This swings the stator blades to their low angle position.

In the embodiment of FIGURE 6 the blades of the second stator are fixed. However, in other respects the operation of the converter of the FIGURE 6 is the same as the operation of the FIGURE 1 embodiment. The first stator blades and their carrier are preferably cast or otherwise formed as a unitary part as shown in FIGS. 6 and 7.

The various modifications of the invention disclosed above may be further modified within the scope of the appended claims.

We claim:
1. In a hydrodynamic torque converter, a plurality of elements mounted with respect to each other to define a torus having an annular core, a set of blades on each of said elements disposed in a working position for directing working fluid in said converter in flow paths which vary with changing loads on said converter, an axially movable carrier connected to one set of said blades, supporting means for said carrier, means connecting said carrier and another of said elements to guide said set of blades connected to said axially movable carrier from a working position into said core in response to a predetermined change in load on said converter and to guide said axially movable element back into said working fluid from said core in response to another predetermined change in load on said converter, said supporting means being an annular pilot ring disposed in said annular core, and said connecting means being formed by a plurality of helical slots in said carrier and a plurality of slot-engaging pins projecting radially from said pilot ring.

2. In a hydrodynamic torque converter, a plurality of elements mounted with respect to each other to define a torus having an annular core, a set of blades on each of said elements disposed in a working position for directing working fluid in said converter in flow paths which vary with changing loads on said converter, an axially movable carrier connected to one set of said blades, supporting means for said carrier, means connecting said carrier and another of said elements to guide said set of blades connected to said axially movable carrier from a working position into said core in response to a predetermined change in load on said converter and to guide said axially movable element back into said working fluid from said core in response to another predetermined change in load on said converter, said another of said elements being a stator with variable pitch blades, said last mentioned stator having a plurality of extending pins on which said variable pitch blades are mounted, said supporting means being formed by a pilot ring disposed in said core and mounted on the end portions of said pins, said connecting means including said pins and a plurality of helical slots formed internally in said carrier for engagement with said pins.

3. In a hydrodynamic torque converter, rotatable input and output means, a bladed pump operatively connected to said input means for pumping a working fluid in said converter, a turbine assembly operatively connected to said output means and cooperating with said pump to define an inner core therebetween, said assembly having first and second sets of blades, said sets of blades being spaced from each other, first and second stators operatively connected to each other, a ground, one of said stators being positioned between said sets of blades, one-way brake means operatively connecting said second stator to said ground to permit rotation of both of said stators in one direction and to retard rotation of both of said stators in an opposite direction, said first stator having vanes curved to direct fluid from said first turbine blades into said second turbine blades to condition said converter for high torque multiplication, a plurality of pins and helical slots connecting said first and second stator to permit the working fluid to screw said first stator substantially into the core of said torque converter on decrease in torque demand to thereby condition said converter for reduced torque multiplication and to screw said first stator from said core back into the working fluid in response to increasing torque demand and thereby condition said converter for increased torque multiplication.

4. In a hydrodynamic torque converter, a plurality of rotatable converter elements including a stator mounted with respect to each other to define a torus having an annular core, each of said elements and said stator having a set of blades disposed in a position for directing working fluid in said converter in flow paths which vary in accordance with the load imposed on said converter, one-way brake means for preventing rotation of said stator in one direction, said stator having a carrier operatively connected to said brake means and mounted entirely in said core for supporting said stator blades and for axially moving said stator blades between working and non-working positions within said converter, and connecting means including helical means to guide said carrier and said stator blades between a working position between two of said converter elements and to an inactive position within said core solely in response to reduction in load on said converter and to guide said carrier and said blades back into said working position from said core solely in response to an increase in load on said converter.

5. The torque converter of claim 4, said helical means being helical slots disposed internally of said carrier, said connecting means including pin means having end portions located in said slots and said stator blades having tips which extend into said torus when said carrier is in said core to permit the fluid in said converter to exert a force on said carrier to move said stator into said torus when said load on said converter increases.

References Cited
UNITED STATES PATENTS

| | | | |
|---|---|---|---|
| 2,339,484 | 1/1944 | Jandasek | 60—54 |
| 2,377,825 | 6/1945 | Teagno | 60—54 |
| 2,377,826 | 6/1945 | Teagno | 60—54 |
| 2,697,330 | 12/1954 | Odman | 60—54 |

EDGAR W. GEOHEGAN, Primary Examiner